US012154740B2

(12) United States Patent
Horiuchi et al.

(10) Patent No.: US 12,154,740 B2
(45) Date of Patent: Nov. 26, 2024

(54) ELECTRONIC COMPONENT

(71) Applicant: OMRON Corporation, Kyoto (JP)

(72) Inventors: Kasumi Horiuchi, Koushi (JP); Yoshiaki Mimura, Kikuchi (JP); Kazuhiro Tsutsui, Kumamoto (JP)

(73) Assignee: OMRON CORPORATION, Kyoto (JP)

( * ) Notice: Subject to any disclaimer, the term of this patent is extended or adjusted under 35 U.S.C. 154(b) by 164 days.

(21) Appl. No.: 17/297,458

(22) PCT Filed: Oct. 16, 2019

(86) PCT No.: PCT/JP2019/040547
§ 371 (c)(1),
(2) Date: May 27, 2021

(87) PCT Pub. No.: WO2020/137093
PCT Pub. Date: Jul. 2, 2020

(65) Prior Publication Data

US 2022/0037102 A1 Feb. 3, 2022

(30) Foreign Application Priority Data

Dec. 27, 2018 (JP) ................................ 2018-246115

(51) Int. Cl.
*H01H 51/29* (2006.01)
*H01H 50/02* (2006.01)
*H01H 50/06* (2006.01)

(52) U.S. Cl.
CPC .......... *H01H 50/06* (2013.01); *H01H 50/023* (2013.01); *H01H 51/29* (2013.01)

(58) Field of Classification Search
CPC .................................................... H01H 50/023
USPC .......................................................... 335/202
See application file for complete search history.

(56) References Cited

U.S. PATENT DOCUMENTS 3,271,710 A * 9/1966 Leonard ................ H01F 27/085 165/47
6,236,575 B1 * 5/2001 Ritter ................... H01H 50/305 439/271
7,157,996 B2 * 1/2007 Enomoto ............... H01H 50/02 335/126

(Continued)

FOREIGN PATENT DOCUMENTS

JP 55-86199 A 6/1980
JP 57-127446 U 8/1982

(Continued)

OTHER PUBLICATIONS

International Search Report of International Application No. PCT/JP2019/040547 issued on Dec. 17, 2019.

(Continued)

*Primary Examiner* — Alexander Talpalatski
(74) *Attorney, Agent, or Firm* — SHINJYU GLOBAL IP

(57) ABSTRACT

An electronic component includes an internal component, an inner case, and an outer case. The inner case is hermetically sealed and houses the internal component. The outer case is arranged outside the inner case with a gap between the outer case and the inner case. The outer case includes an opening. The opening communicates the gap with an outside of the outer case.

14 Claims, 14 Drawing Sheets

(56) References Cited

U.S. PATENT DOCUMENTS

| | | | | |
|---|---|---|---|---|
| 7,514,642 | B2 * | 4/2009 | Burca | H01H 9/047 200/293 |
| 8,164,404 | B2 * | 4/2012 | Kamiya | H01H 50/12 335/201 |
| 10,283,286 | B2 * | 5/2019 | Kroepfl | H01H 9/043 |
| 10,636,600 | B2 * | 4/2020 | Tanaka | H01H 9/043 |
| 10,679,812 | B2 * | 6/2020 | Tanaka | H01H 50/023 |
| 2003/0216153 | A1 | 11/2003 | Golioto | |
| 2006/0050468 | A1 | 3/2006 | Inoue et al. | |
| 2006/0207780 | A1 | 9/2006 | Shinmura et al. | |
| 2008/0084260 | A1 * | 4/2008 | Swartzentruber | H01H 50/023 335/151 |
| 2009/0102586 | A1 * | 4/2009 | Bush | H01H 50/023 335/153 |
| 2009/0237191 | A1 * | 9/2009 | Yano | H01H 50/38 335/202 |
| 2011/0120844 | A1 * | 5/2011 | Hoffmann | H01H 50/02 200/275 |
| 2014/0085786 | A1 | 3/2014 | Kawada et al. | |
| 2014/0253267 | A1 | 9/2014 | Mimura et al. | |
| 2015/0368459 | A1 | 12/2015 | Yamanaka et al. | |
| 2017/0229270 | A1 | 8/2017 | Liang et al. | |
| 2020/0043687 | A1 * | 2/2020 | Kobayashi | H01H 50/023 |
| 2022/0115191 | A1 * | 4/2022 | Sullivan | H01H 50/023 |
| 2023/0005687 | A1 * | 1/2023 | Katakami | H01H 49/00 |

FOREIGN PATENT DOCUMENTS

| | | | |
|---|---|---|---|
| JP | 59-171324 | U | 11/1984 |
| JP | 60-10253 | U | 1/1985 |
| JP | 60-126954 | U | 8/1985 |
| JP | 4-102535 | U | 9/1992 |
| JP | 5-15286 | U | 2/1993 |
| JP | 9-17306 | A | 1/1997 |
| JP | H0917306 | A * | 1/1997 |
| JP | 10-144978 | A | 5/1998 |
| JP | 11-312450 | A | 11/1999 |
| JP | 2002-9362 | A | 1/2002 |
| JP | 2004-111683 | A | 4/2004 |
| JP | 2004-319712 | A | 11/2004 |
| JP | 2006-261368 | A | 9/2006 |
| JP | 2006-286969 | A | 10/2006 |
| JP | 2009-188003 | A | 8/2009 |
| JP | 2010-123762 | A | 6/2010 |
| JP | 2013-150067 | A | 8/2013 |
| JP | 2014-82451 | A | 5/2014 |
| JP | 2014-133808 | A | 7/2014 |
| JP | 2014-175172 | A | 9/2014 |
| JP | 2014-204227 | A | 10/2014 |
| JP | 2017-139166 | A | 8/2017 |
| JP | 2018-119773 | A | 8/2018 |
| WO | 2005/029519 | A1 | 3/2005 |

OTHER PUBLICATIONS

Written Opinion of the International Searching Authority of International Application No. PCT/JP2019/040547 issued on Dec. 17, 2019.

The Office Action of the corresponding Japanese application No. 2018-246115 issued on Aug. 23, 2022.

The Office Action of the corresponding Japanese application No. 2018-246115 issued on Feb. 21, 2023.

* cited by examiner

ELECTRONIC COMPONENT

CROSS-REFERENCE TO RELATED APPLICATION

This application is the U.S. National Phase of International Application No. PCT/JP2019/040547, filed on Oct. 16, 2019. This application claims priority to Japanese Patent Application No. 2018-246115, filed Dec. 27, 2018. The contents of those applications are incorporated by reference herein in their entireties.

FIELD

The present invention relates to an electronic component.

BACKGROUND

An electronic component may be exposed to a high temperature environment when mounted on a substrate. For example, in reflow soldering, the solder is preliminarily attached to the relay at room temperature. After that, both the electronic component and the substrate are heated in the furnace to melt the solder. As a result, the electronic component is soldered to the substrate.

When the electronic component is exposed to the high temperature environment, the internal air expands due to the temperature rise inside the case. Therefore, when the case of the electronic component is sealed, the case may be deformed or airtightly broken. Therefore, in the relay disclosed in Japan Laid-open Patent Application Publication No. JP2014-175172A, a degassing hole is provided in the case.

SUMMARY

If the case is provided with the degassing hole, a foreign matter may enter the case through the degassing hole. In that case, there is a concern that damage due to the foreign matter may occur in the electrical component. Such intrusion of the foreign matter can be prevented by performing a process of sealing the degassing hole after mounting the electronic component on the substrate. However, in that case, the number of steps for mounting the electronic component increases. An object of the present invention is to improve heat resistance of an electronic component while suppressing an obstacle due to an intrusion of a foreign matter and an increase in mounting process of the electronic component.

An electronic component according to one aspect includes an internal component, an inner case, and an outer case. The inner case is hermetically sealed and houses the internal component. The outer case is arranged outside the inner case with a gap between the outer case and the inner case. The outer case includes an opening. The opening communicates the gap with an outside of the outer case.

In the electronic component according to the present aspect, the inner case is hermetically sealed. Therefore, it is possible to prevent an obstacle due to an intrusion of a foreign matter while suppressing an increase in mounting process of the electronic component. Further, the gap is provided between the inner case and the outer case. Therefore, the temperature rise in the inner case can be suppressed due to the heat insulating property of the air in the outer case and the gap. Thereby, the heat resistance of the electronic component can be improved.

Further, the gap communicates with the outside of the outer case through the opening. Therefore, even if the outer case becomes hot, the expanded air can escape from the opening to the outside of the outer case. As a result, deformation of the outer case or occurrence of airtight destruction can be suppressed, and the heat resistance of the electronic component can be improved.

The outer case may be fixed to the inner case. In this case, it is possible to prevent the outer case from falling off from the inner case.

The electronic component may further include a rib. The rib may be provided on an outer surface of the inner case or an inner surface of the outer case. In this case, the rib can provide the gap between the inner case and the outer case.

The inner case may include a base and a cover. The base may support the internal component. The cover may be attached to the base. The cover may include an inner side surface and an inner top surface. The inner side surface may be attached to the base. The inner top surface may face the base. The outer case may include an outer side surface and an outer top surface. The outer top surface may be arranged outside the inner top surface. The outer side surface may be arranged outside the inner side surface. The gap may be provided between the inner top surface and the outer top surface. In this case, the heat insulating property between the inner top surface and the outer top surface can be improved. Thereby, the heat resistance of the electronic component can be improved.

The electronic component may further include a rib protruding from the inner top surface or the outer top surface. In this case, the rib can provide the gap between the inner top surface and the outer top surface.

The gap may be provided between the inner side surface and the outer side surface. In this case, the heat insulating property between the inner side surface and the outer side surface can be improved. Thereby, the heat resistance of the electronic component can be improved.

The electronic component may further include a rib protruding from the inner side surface or the outer side surface. In this case, the rib can provide the gap between the inner side surface and the outer side surface.

The outer case may be bonded to the inner case. In this case, the outer case can be fixed to the inner case by adhesion.

One of the outer case and the inner case may include a locking portion that locks to the other. In this case, the outer case can be fixed to the inner case by the locking portion.

The inner case may be arranged in the outer case through the opening. The gap may communicate with the outside of the outer case through a space between the opening and the inner case. In this case, when the outer case becomes hot, air can escape to the outside through the space between the opening and the inner case. Thereby, deformation or breakage of the outer case can be suppressed.

A size of the gap between the opening and the inner case may be smaller than a thickness of the outer case. In this case, the small gap can prevent the air from freely convection between the outside of the outer case and the gap. Thereby, the heat insulating property by the air in the gap can be ensured.

The opening may be a through hole provided in the outer case.

The thickness of the outer case may be larger than a thickness of the inner case. In this case, the heat insulating property of the outer case can be improved.

The outer case may be made of a material having higher heat resistance than the inner case. In this case, the heat resistance of the outer case can be improved.

The outer case may be composed of a plurality of parts.

The electronic component may be a relay. In this case, it is possible to suppress the occurrence of contact failure due to the intrusion of a foreign matter and improve the heat resistance of the relay.

The electronic component may further include a fixed contact, a movable contact, and a drive device. The movable contact may be configured to move between a first position and a second position. The movable contact may contact the fixed contact at the first position. The movable contact may be separated from the fixed contact at the second position. The drive device may move the movable contact to the first position and the second position.

DETAILED DESCRIPTION

Figure 1:
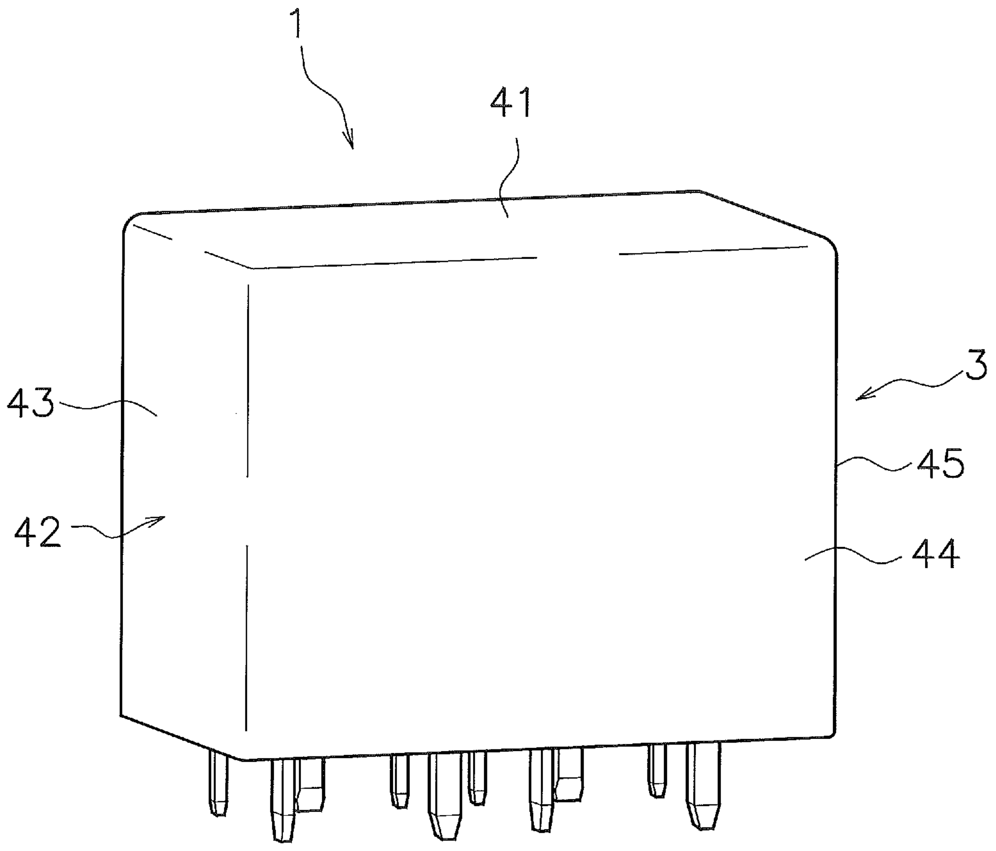
FIG. 1 is a perspective view of an electronic component according to an embodiment.
Figure 2:
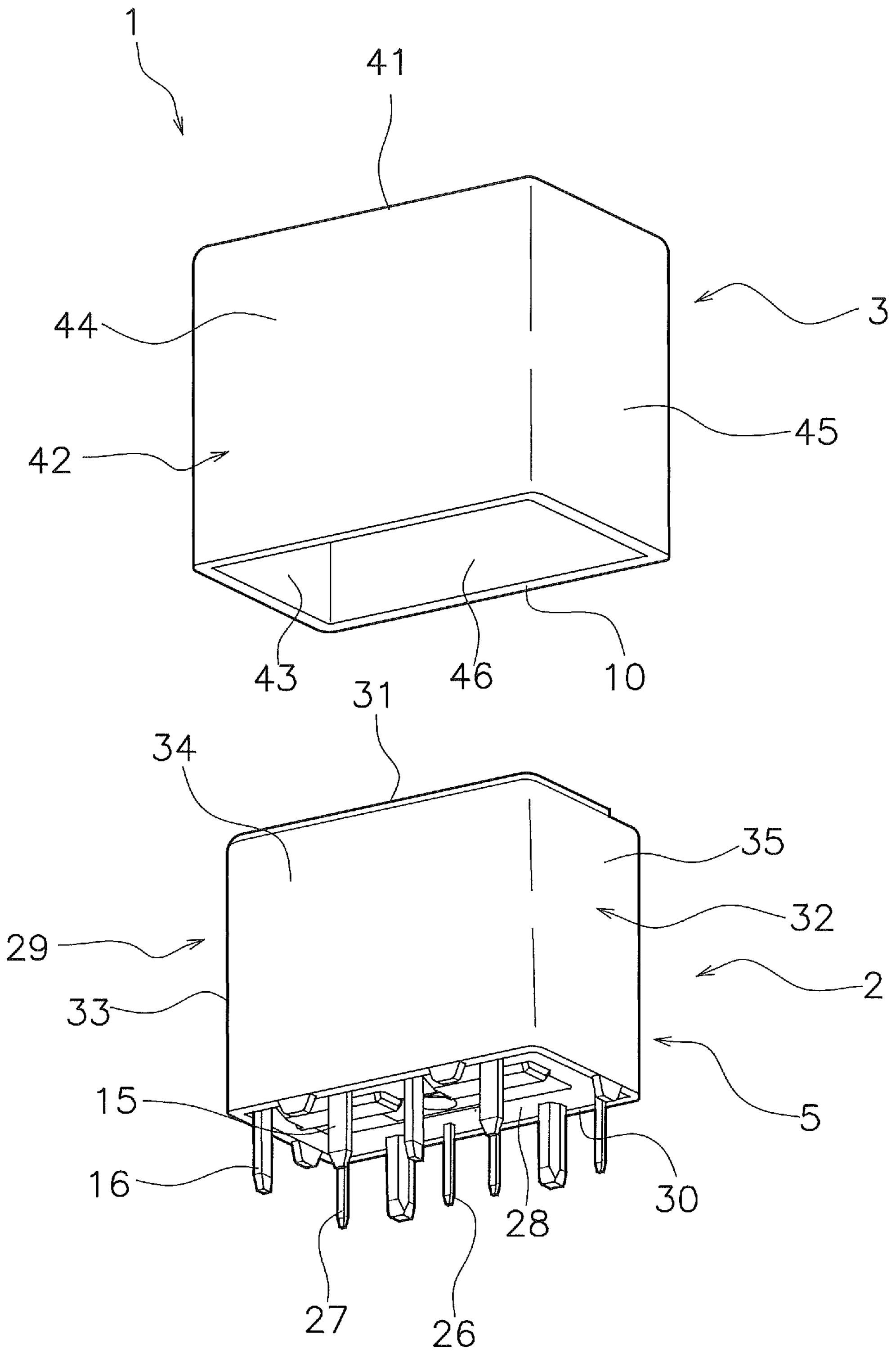
FIG. 2 is an exploded perspective view of the electronic component.

Hereinafter, an example of an electronic component according to an embodiment will be described with reference to the drawings. FIG. 1 is a perspective view showing an electronic component 1 according to an embodiment. FIG. 2 is an exploded perspective view showing the electronic component 1. The electronic component 1 according to the present embodiment is a relay.

As illustrated in FIG. 2, the electronic component 1 includes a relay body 2 and an outer case 3. The outer case 3 is attached to the relay body 2. The outer case 3 includes an opening 10. The opening 10 of the outer case 3 is larger than the outer shape of the relay body 2. The relay body 2 is arranged in the outer case 3 through the opening 10.

Figure 3:
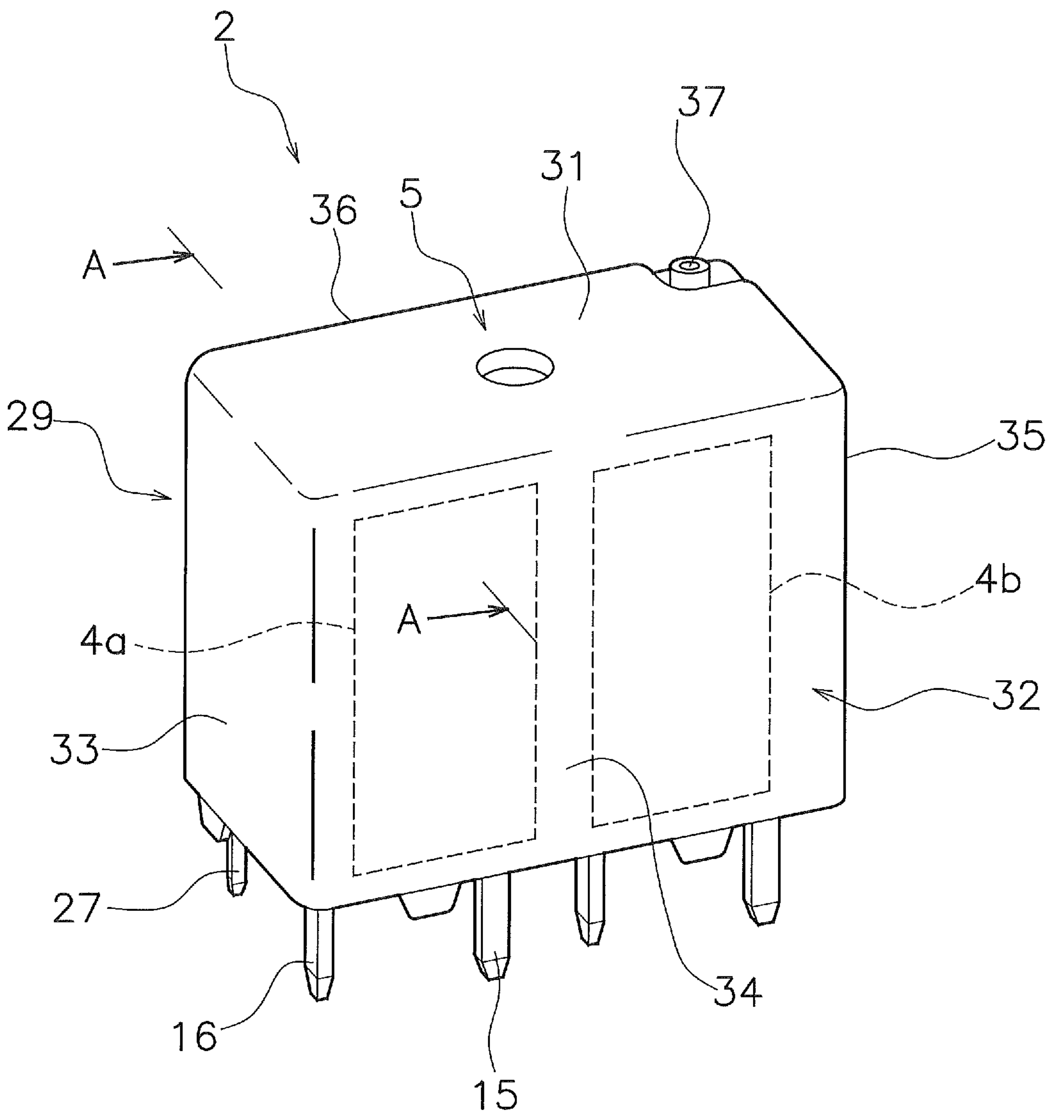
FIG. 3 is a perspective view of a relay body.
Figure 4:
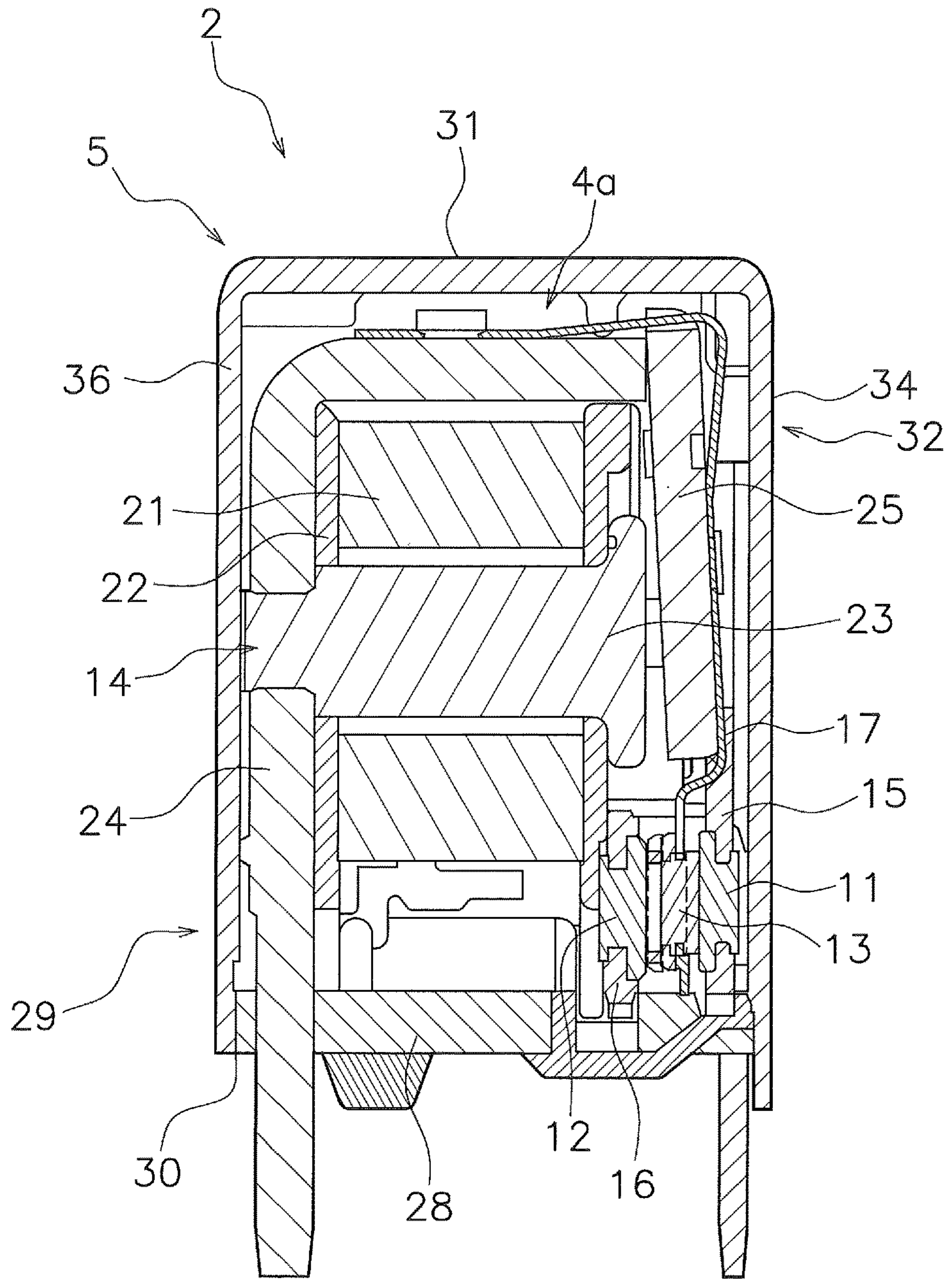
FIG. 4 is a cross-sectional view of the relay body.

FIG. 3 is a perspective view of the relay body 2. FIG. 4 is a cross-sectional view of the relay body 2 (A-A cross section in FIG. 3). As illustrated in FIG. 3, the relay body 2 includes a first internal component 4*a*, a second internal component 4*b*, and an inner case 5.

As illustrated in FIG. 4, the first internal component 4*a* includes a first fixed contact 11, a second fixed contact 12, a movable contact 13, and a drive device 14. The first fixed contact 11 is connected to a first fixed terminal 15. The second fixed contact 12 is connected to a second fixed terminal 16. As illustrated in FIG. 3, a part of the first fixed terminal 15 is exposed to the outside of the relay body 2. A part of the second fixed terminal 16 is exposed to the outside of the relay body 2.

The movable contact 13 is arranged between the first fixed contact 11 and the second fixed contact 12. The movable contact 13 is connected to a movable contact piece 17. The movable contact 13 is movably arranged between a first position and a second position. In FIG. 4, the movable contact 13 at the first position is illustrated by a solid line, and the movable contact 13 at the second position is illustrated by a broken line. At the first position, the movable contact 13 contacts the first fixed contact 11 and separates from the second fixed contact 12. At the second position, the movable contact 13 contacts the second fixed contact 12 and separates from the first fixed contact 11.

The drive device 14 moves the movable contact 13 to the first position and the second position. The drive device 14 includes a coil 21, a bobbin 22, an iron core 23, a yoke 24, and an armature 25. The coil 21 is wound around the bobbin 22. The coil 21, when energized, generates a magnetic force that moves the armature 25. Coil terminals 26 and 27 illustrated in FIG. 2 are connected to the coil 21. A part of the coil terminals 26 and 27 is exposed to the outside of the relay body 2. The iron core 23 is arranged in the coil 21 and the bobbin 22. The yoke 24 is connected to the iron core 23. The armature 25 is connected to the movable contact piece 17. The armature 25 is urged in a direction toward the first position by the elastic force of the movable contact piece 17.

When the coil 21 is not energized and the drive device 14 is demagnetized, the armature 25 is not attracted to the iron core 23. Therefore, the movable contact 13 is located at the first position due to the elastic force of the movable contact piece 17. Therefore, the movable contact 13 contacts the first fixed contact 11 and is separated from the second fixed contact 12. When the coil 21 is energized and the drive device 14 is magnetize, the armature 25 is attracted to the iron core 23 to move the movable contact 13 from the first position to the second position against the elastic force of the movable contact piece 17. As a result, the movable contact 13 contacts the second fixed contact 12 and is separated from the first fixed contact 11.

When the energization of the coil 21 is stopped and the drive device 14 is demagnetized, the armature 25 moves in the direction away from the iron core 23 due to the elastic force of the movable contact piece 17. Therefore, the movable contact 13 moves from the second position to the first position. As a result, the movable contact 13 contacts the first fixed contact 11 and is separated from the second fixed contact 12.

The inner case 5 houses the first internal component 4*a* inside. The inner case 5 includes a base 28 and a cover 29. The base 28 supports the first internal component 4*a*. The first fixed terminal 15, the second fixed terminal 16, and the coil terminals 26 and 27 are attached to the base 28. As illustrated in FIG. 2, the first fixed terminal 15, the second fixed terminal 16, and the coil terminals 26 and 27 project from the base 28 to the outside of the inner case 5.

The second internal component 4*b* is arranged in the inner case 5 together with the first internal component 4*a*. The second internal component 4*b* has the same configuration as the first internal component 4*a*. Therefore, detailed description of the second internal component 4*b* will be omitted.

The cover 29 is attached to the base 28. The space between the cover 29 and the base 28 is sealed. The cover 29 includes an opening 30. The opening 30 is larger than the outer shape of the base 28. At least a part of the base 28 is disposed in the cover 29 through the opening 30. The cover 29 includes an inner top surface 31 and an inner side surface 32. The inner top surface 31 is arranged to face the base 28. The inner side surface 32 is attached to the base 28. The inner side surface 32 includes the first to fourth inner side surfaces 33 to 36. The first inner side surface 33 and the third inner side surface 35 are arranged to face each other. The second inner side surface 34 and the fourth inner side surface 36 are arranged to face each other.

The inner case 5 is not provided with a degassing hole, and the inner case 5 is hermetically sealed. However, as illustrated in FIG. 3, the cover 29 includes a mark 37 of the degassing hole. When the base 28 and the cover 29 are sealed in the manufacturing process of the relay body 2, the degassing hole is opened. As a result, when the base 28 and the cover 29 are sealed, the air in the inner case 5 can be released from the degassing hole. Then, after the base 28 and the cover 29 are sealed, the degassing hole is sealed. As a result, the mark 37 of the degassing hole is formed on the cover 29.

Figure 5:
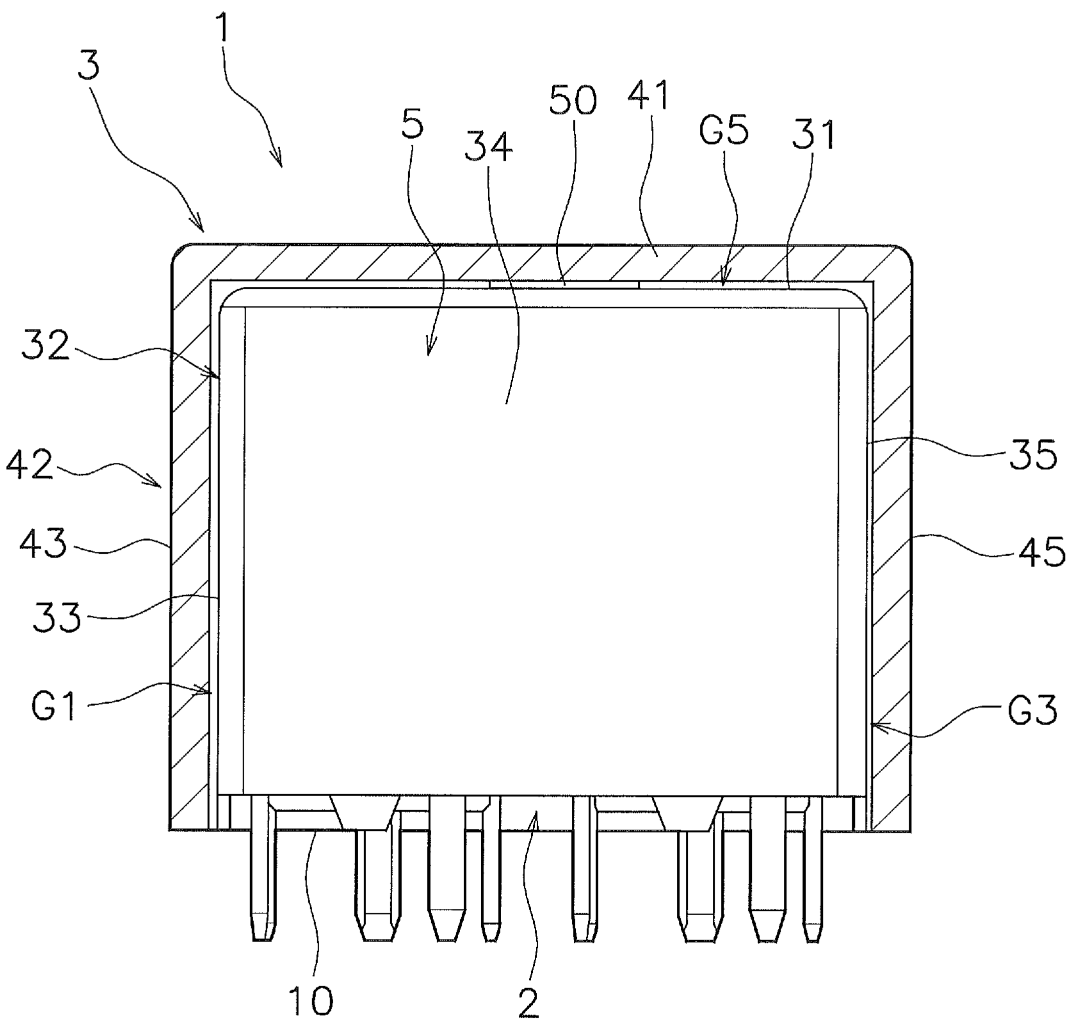
FIG. 5 is a cross-sectional view of the electronic component.

FIG. 5 is a cross-sectional view of the electronic component 1. As illustrated in FIG. 5, the outer case 3 is arranged outside the inner case 5 and covers the inner case 5. The outer case 3 is made of, for example, a heat-resistant resin. The thickness of the outer case 3 is larger than the thickness of the inner case 5. The outer case 3 is arranged outside the inner case 5 with a gap between the outer case 3 and the inner case 5.

The outer case 3 includes an outer top surface 41 and an outer side surface 42. The outer top surface 41 is arranged outside the inner top surface 31. The outer side surface 42 is arranged outside the inner side surface 32. As illustrated in FIG. 2, the outer side surface 42 includes first to fourth outer side surfaces 43 to 46. The first outer side surface 43 and the third outer side surface 45 are arranged to face each other. The second outer side surface 44 and the fourth outer side surface 46 are arranged to face each other.

Figure 6:
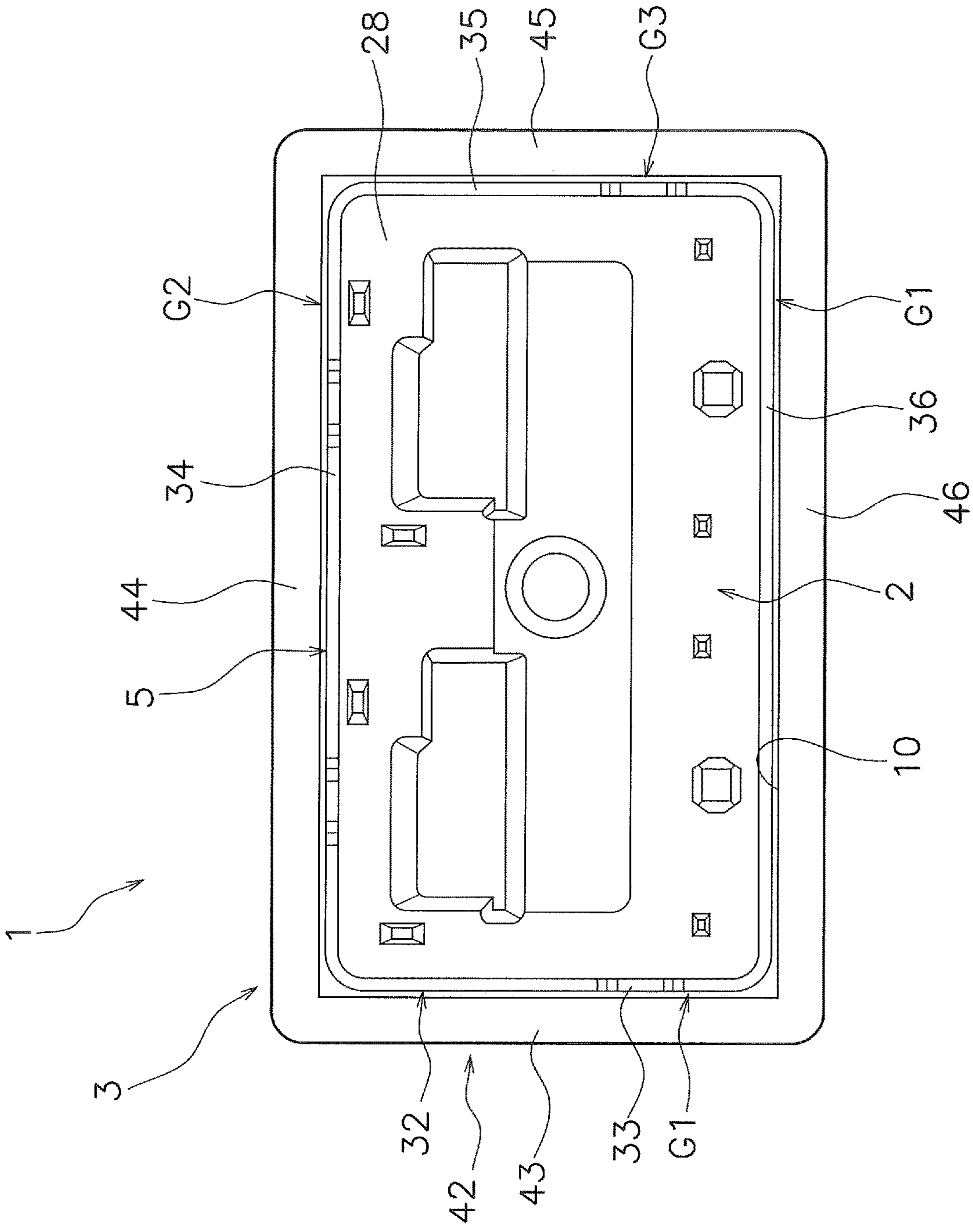
FIG. 6 is a bottom view of the electronic component.

FIG. 6 is a bottom view of the electronic component 1. As illustrated in FIGS. 5 and 6, the first outer side surface 43 is arranged outside the first inner side surface 33. A first gap G1 is provided between the first outer side surface 43 and the first inner side surface 33. The second outer side surface 44 is arranged outside the second inner side surface 34. A second gap G2 is provided between the second outer side surface 44 and the second inner side surface 34. The third outer side surface 45 is arranged outside the third inner side surface 35. A third gap G3 is provided between the third outer side surface 45 and the third inner side surface 35. The fourth outer side surface 46 is arranged outside the fourth inner side surface 36. A fourth gap G4 is provided between the fourth outer side surface 46 and the fourth inner side surface 36. As illustrated in FIG. 5, an upper gap G5 is provided between the outer top surface 41 and the inner top surface 31.

The outer case 3 is fixed to the inner case 5. The outer case 3 is bonded to the inner case 5. Specifically, the outer top surface 41 is bonded to the inner top surface 31. Therefore, an adhesive layer 50 is provided between the outer top surface 41 and the inner top surface 31. The outer top surface 41 is partially bonded to the inner top surface 31.

Figure 7:
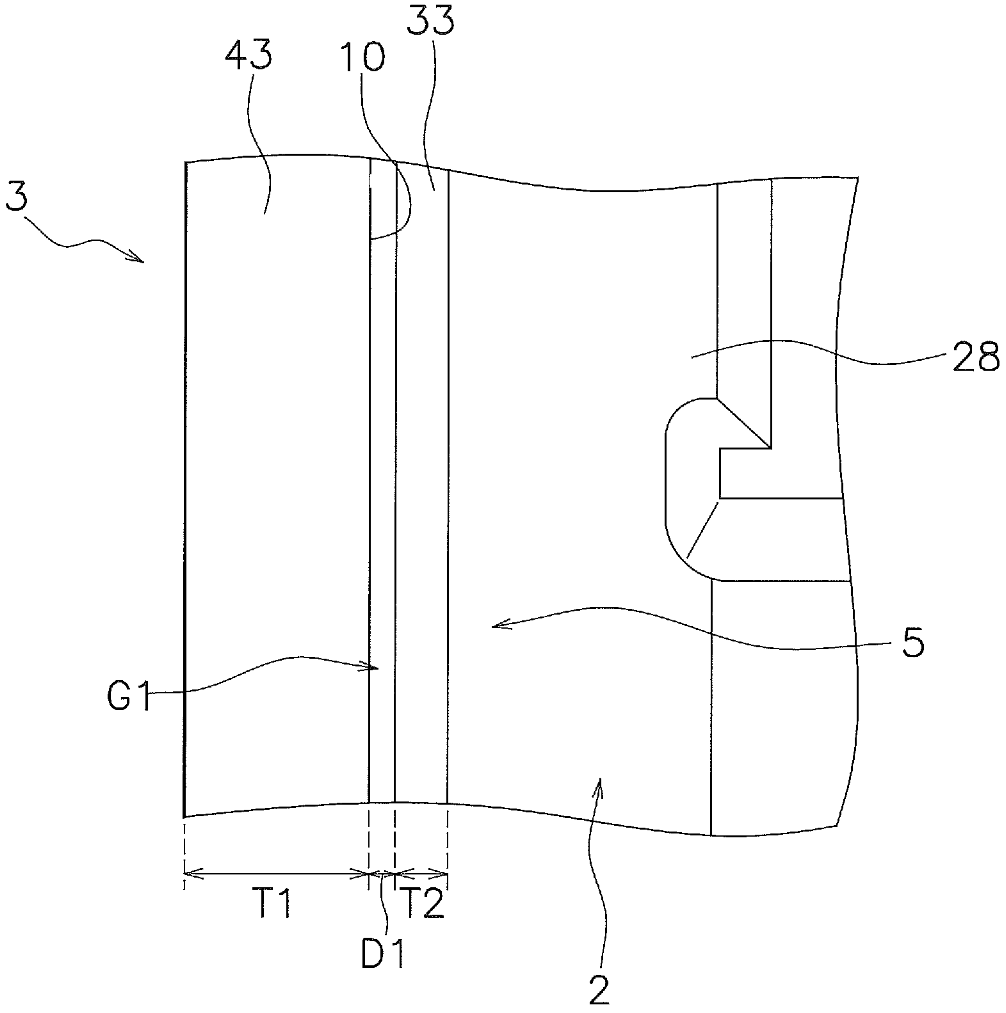
FIG. 7 is an enlarged bottom view of the electronic component.

The gaps G1 to G5 communicate with the outside of the outer case 3 through a space between the opening 10 and the inner case 5. FIG. 7 is an enlarged view of the first inner side surface 33 and the first outer side surface 43. As illustrated in FIG. 7, the size D1 of the first gap G1 between the opening 10 and the inner case 5 is smaller than the thickness T1 of the outer case 3. The size D1 of the first gap G1 between the opening 10 and the inner case 5 is smaller than the thickness T2 of the inner case 5.

The second to fourth gaps G2 to G4 are the same as those of the first gap G1. That is, the size of the second to fourth gaps G2 to G4 between the opening 10 and the inner case 5 is smaller than the thickness T1 of the outer case 3, respectively. The size of the second to fourth gaps G2 to G4 between the opening 10 and the inner case 5 is smaller than the thickness T2 of the inner case 5, respectively.

The thickness T1 of the outer case 3 is larger than the thickness T2 of the inner case 5. Preferably, the thickness T1 of the outer case 3 is 1.5 times or more the thickness T2 of the inner case 5. Preferably, the thickness T1 of the outer case 3 is twice or more the thickness T2 of the inner case 5.

In the electronic component 1 according to the present embodiment described above, the inner case 5 is sealed. Therefore, it is possible to prevent an obstacle due to an intrusion of a foreign matter while suppressing an increase in the mounting process of the electronic component 1. Further, the gaps G1 to G5 are provided between the inner case 5 and the outer case 3. Therefore, the temperature rise in the inner case 5 can be suppressed due to the heat insulating property of the air in the outer case 3 and the gaps G1 to G5. Thereby, the heat resistance of the electronic component 1 can be improved.

Further, the gaps G1 to G5 communicate with the outside of the outer case 3 through the opening 10. Therefore, even if the outer case 3 becomes hot, the expanded air can be released from the opening 10 to the outside of the outer case 3. As a result, deformation of the outer case 3 or occurrence of airtight destruction can be suppressed, and the heat resistance of the electronic component 1 can be improved.

The gaps G1 to G4 communicate with the outside of the outer case 3 through the space between the opening 10 and the inner case 5. The size of the gaps G1 to G4 between the opening 10 and the inner case 5 is smaller than the thickness T1 of the outer case 3. Since the gaps G1 to G4 are small in this way, it is possible to prevent air from freely convection between the outside of the outer case 3 and the gaps G1 to G4. Thereby, the heat insulating property by the air in the gaps G1 to G5 can be ensured.

The size of the gaps G1 to G4 is not limited to the above-mentioned size. The size of the gaps G1 to G4 may be small enough to prevent air from freely convection between the gaps and the outside of the outer case 3. By doing so, the fluid (air layer) functions as a heat insulating material. As a result, the temperature rise of the relay body 2 can be suppressed. Further, it is possible to prevent the outer case 3 or the relay body 2 from being damaged due to the expansion of the fluid (air layer).

The thickness T1 of the outer case 3 is larger than the thickness T2 of the inner case 5. Thereby, the heat resistance of the outer case 3 can be improved. The thickness T1 of the outer case 3 may be the same as or thinner than the thickness T2 of the inner case 5. In that case, the heat resistance of the electronic component 1 can be improved as compared with the case where the outer case 3 is not provided.

Although one embodiment of the present invention has been described above, the present invention is not limited to the above embodiment, and various modifications can be made without departing from the gist of the invention. For example, the electronic component 1 is not limited to a relay, and may be another electronic component 1 such as an integrated circuit or an oscillator.

The configurations of the internal components 4*a* and 4*b* of the electronic component 1 are not limited to those of the above-described embodiment and may be changed. For example, the internal components 4*a* and 4*b* are not limited to the c-contact type configuration, and may have an a-contact type or a b-contact type configuration. One of the internal components 4*a* and 4*b* may be omitted. Alternatively, internal components similar to the internal components 4*a* and 4*b* may be added.

The configuration of the drive device 14 may be changed. The fixed contacts 11 and 12 may be provided separately from or integrated with the fixed terminals 15 and 16. The movable contact 13 may be provided separately from the movable contact piece 17, or may be integrated with the movable contact piece 17.

The outer case 3 may be made of a material having higher heat resistance than the inner case 5. For example, the outer case 3 may be made of an engineering plastic having ultra-high heat resistance characteristics such as type I LCP, and the inner case 5 may be made of a general type heat resistant engineering plastic such as type II LCP. Thereby, the heat resistance of the outer case 3 can be improved.

Figure 8:
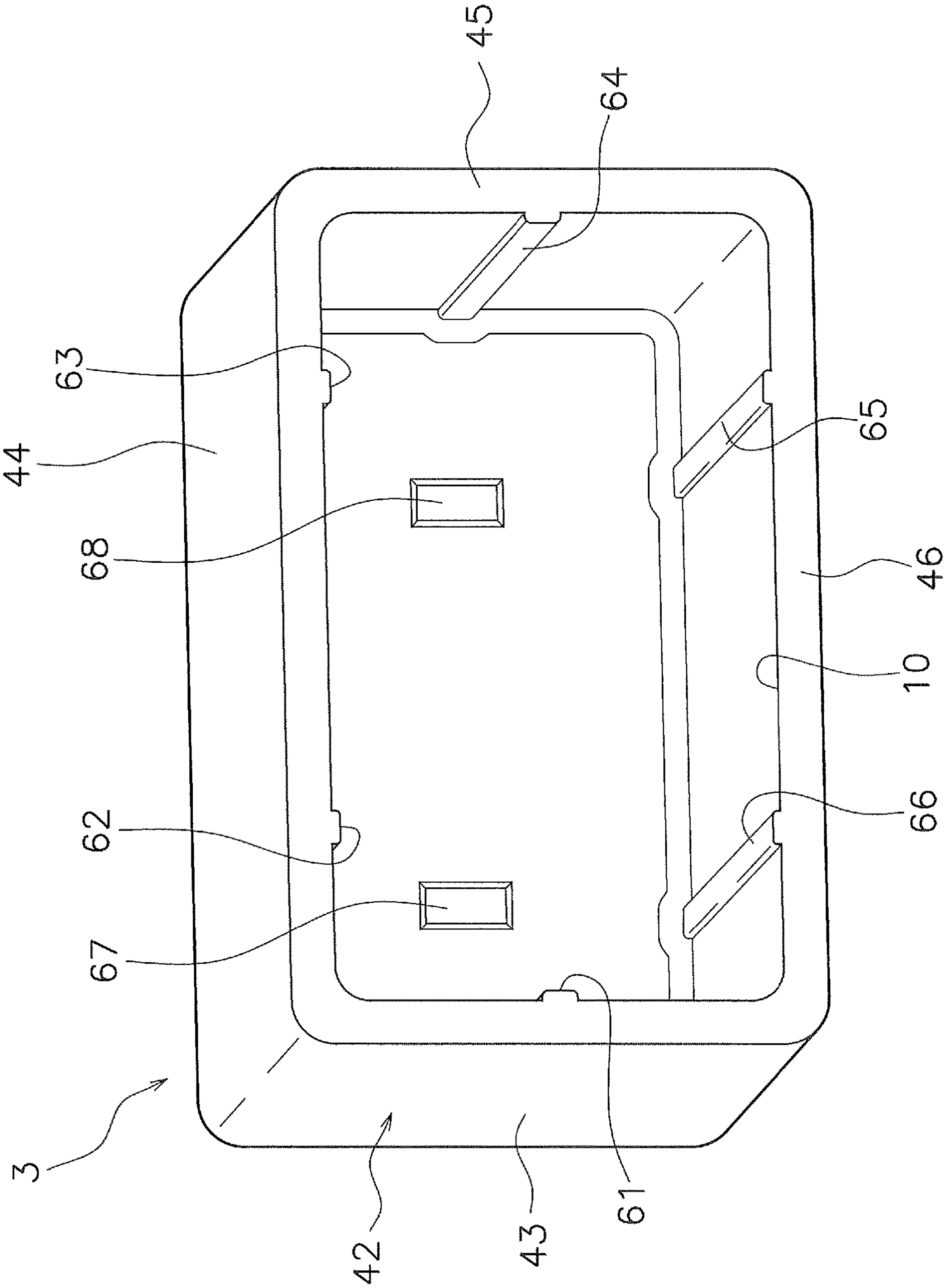
FIG. 8 is a perspective view of an outer case of an electronic component according to a first modification.

The electronic component 1 may include a rib for providing a gap. For example, FIG. 8 is a perspective view showing the outer case 3 of the electronic component 1 according to the first modification. As illustrated in FIG. 8, in the first modification, a plurality of ribs 61 to 68 are provided on the inner surface of the outer case 3.

The rib 61 projects from the inner surface of the first outer side surface 43. The ribs 62 and 63 protrude from the inner surface of the second outer side surface 44. The rib 64 projects from the inner surface of the third outer side surface 45. The ribs 65 and 66 project from the inner surface of the fourth outer side surface 46. The ribs 67 and 68 protrude from the inner surface of the outer top surface 41. When these ribs 61 to 68 contact the outer surface of the inner case 5, a gap can be provided between the inner surface of the outer case 3 and the outer surface of the inner case 5.

Figure 9:
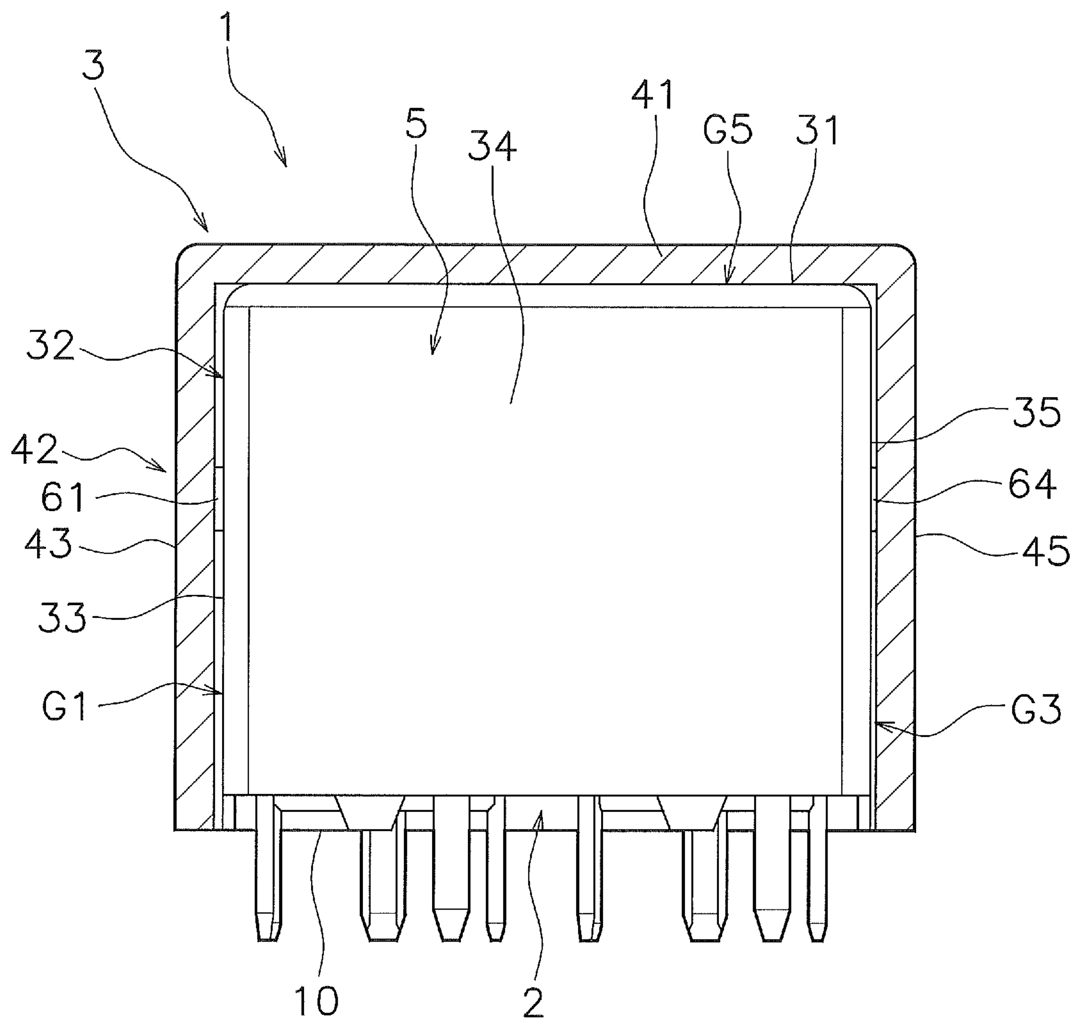
FIG. 9 is a cross-sectional view of an electronic component according to a second modification.

FIG. 9 is a cross-sectional view of the electronic component 1 according to the second modification. As illustrated in FIG. 9, the ribs 61 and 64 may be partially provided between the opening 10 and the outer top surface 41. Although not illustrated, the same applies to the other ribs. As a result, the heat insulating property due to the air in the gaps G1 to G5 can be further improved.

Figure 10:
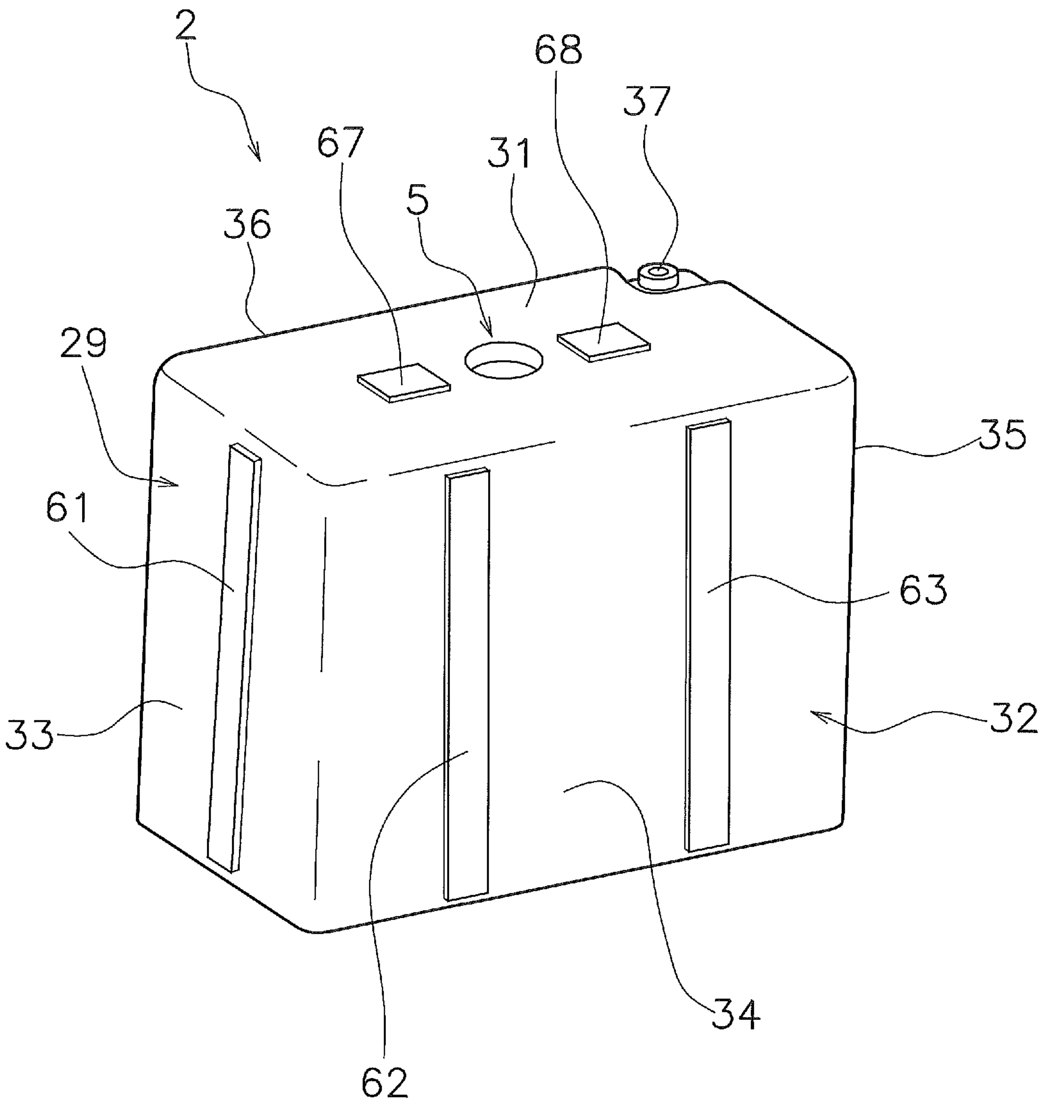
FIG. 10 is a perspective view of an inner case of an electronic component according to a third modification.

The rib may be provided on the outer surface of the inner case 5. For example, FIG. 10 is a perspective view of the inner case 5 of the electronic component 1 according to the third modification. As illustrated in FIG. 10, in the third modification, the ribs 61 to 63, 67, and 68 are provided on the outer surface of the inner case 5. Specifically, the ribs 67 and 68 project from the outer surface of the inner top surface 31. The rib 61 projects from the outer surface of the first inner side surface 33. The ribs 62 and 63 protrude from the outer surface of the second inner side surface 34. Although not illustrated, ribs are similarly provided on the third inner side surface 35 and the fourth inner side surface 36. In addition, in the first to the third modifications, a part of ribs may be omitted. Alternatively, a rib may be added. The positions or shapes of the ribs may be changed.

Figure 11:
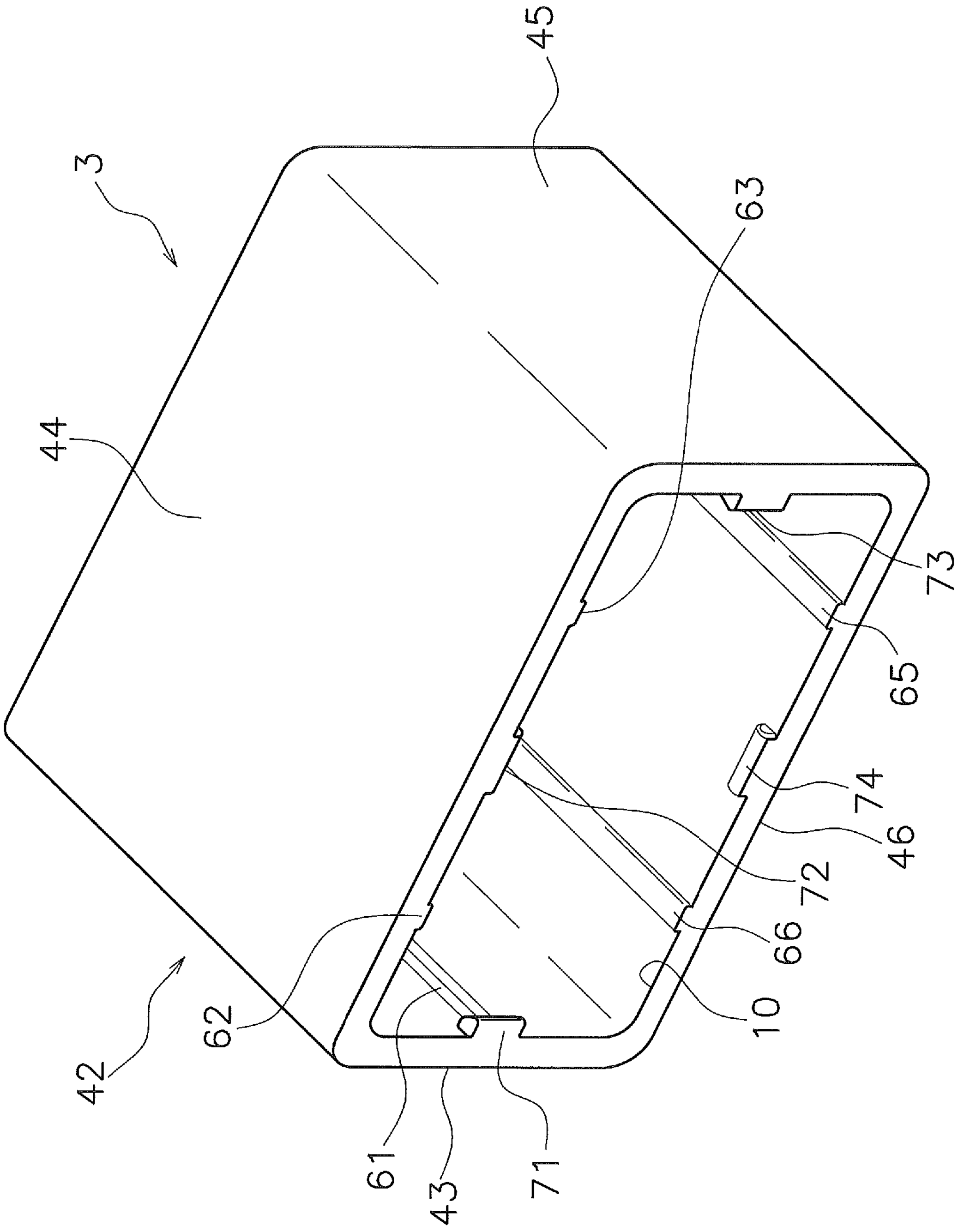
FIG. 11 is a perspective view of an outer case of an electronic component according to a fourth modification.
Figure 12:
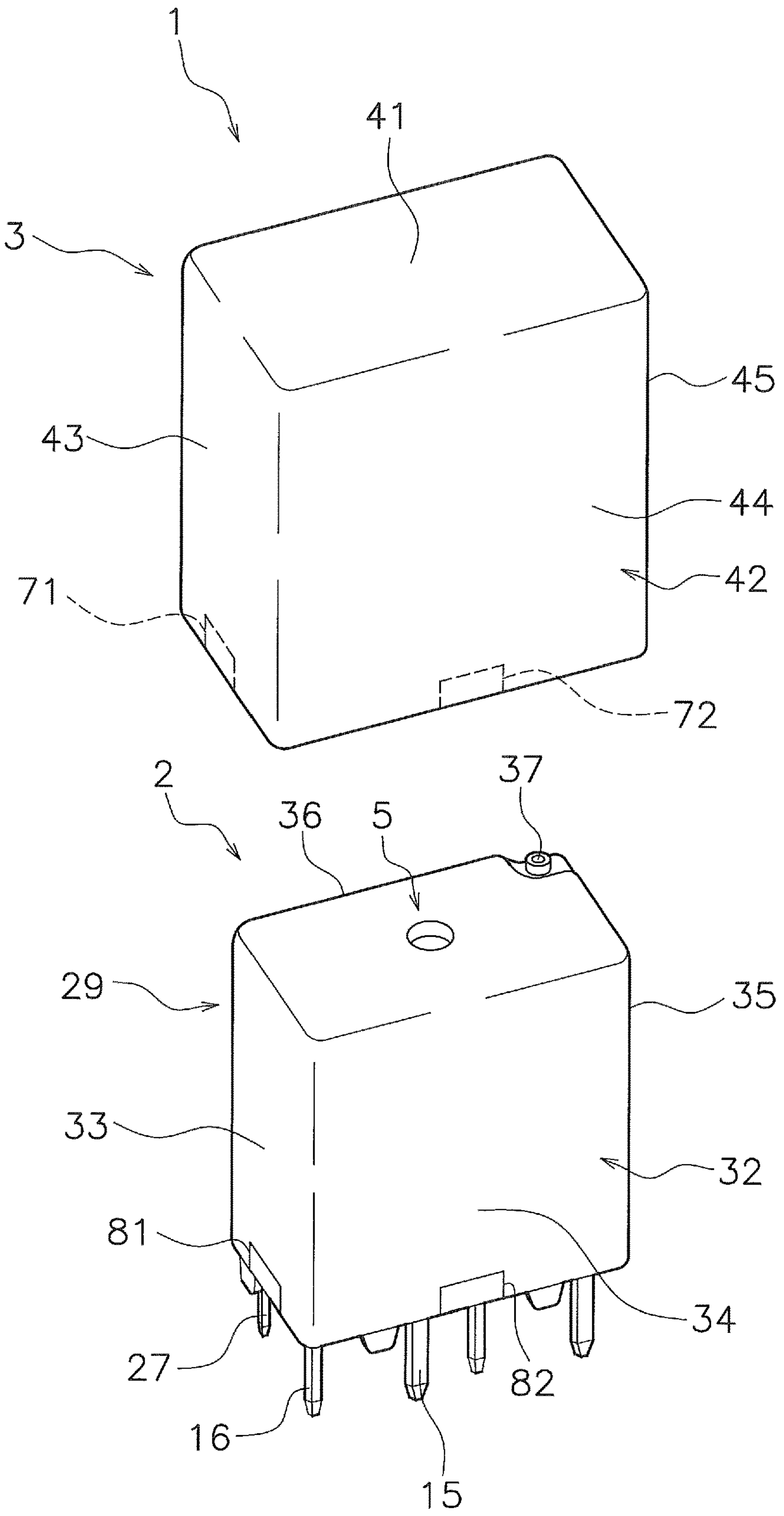
FIG. 12 is an exploded perspective view of the electronic component according to the fourth modification.

In the above embodiment, the outer case 3 is fixed to the inner case 5 by adhesion. However, the method of fixing the outer case 3 to the inner case 5 is not limited to adhesion, and other methods may be used. For example, FIG. 11 is a perspective view of the outer case 3 of the electronic component 1 according to the fourth modification. FIG. 12 is an exploded perspective view of the electronic component 1 according to the fourth modification.

As illustrated in FIG. 11, in the fourth modification, the outer case 3 includes the locking portions 71 to 74. The locking portions 71 to 74 project from the inner surface of the outer case 3. Specifically, the outer case 3 includes first to fourth locking portions 71 to 74. The first locking portion 71 projects from the inner surface of the first outer side surface 43. The second locking portion 72 projects from the inner surface of the second outer side surface 44. The third locking portion 73 projects from the inner surface of the third outer side surface 45. The fourth locking portion 74 projects from the inner surface of the fourth outer side surface 46.

As illustrated in FIG. 12, the inner case 5 includes a first locked portion 81 and a second locked portion 82. The first locked portion 81 is locked to the first locking portion 71. The second locked portion 82 is locked to the second locking portion 72. Although not illustrated, the inner case 5 includes a third locked portion and a fourth locked portion. The third locked portion is locked to the third locking portion 73. The fourth locked portion is locked to the fourth locking portion 74. By locking these locking portions to the locked portions, the outer case 3 is fixed to the inner case 5.

That is, the outer case 3 may be fixed to the inner case 5 by snap-fitting. In the fourth modification, a part of the locking portions and the locked portions may be omitted. Alternatively, a locking portion and a locked portion may be added. The positions or shapes of the locking portions and the locked portions may be changed. Contrary to the above, the inner case 5 may be provided with a locking portion, and the outer case 3 may be provided with a locked portion.

Figure 13:
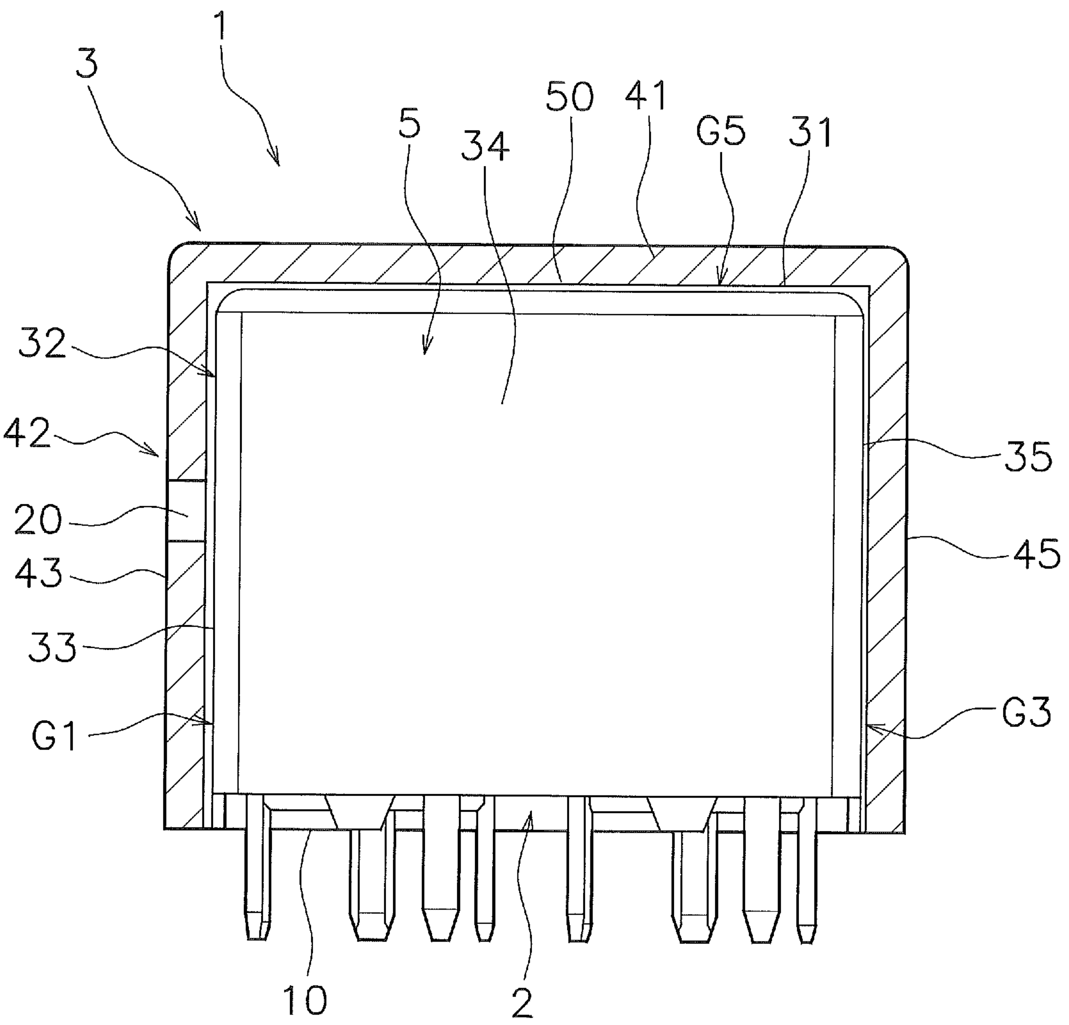
FIG. 13 is a cross-sectional view of an electronic component according to a fifth modification.

FIG. 13 is a cross-sectional view of the electronic component 1 according to the fifth modification. As illustrated in FIG. 13, the outer case 3 may be provided with a through hole 20. The gaps G1 to G5 between the outer case 3 and the inner case 5 may communicate with the outside of the outer case 3 through the through hole 20. In this case, the opening 10 may be closed.

Figure 14:
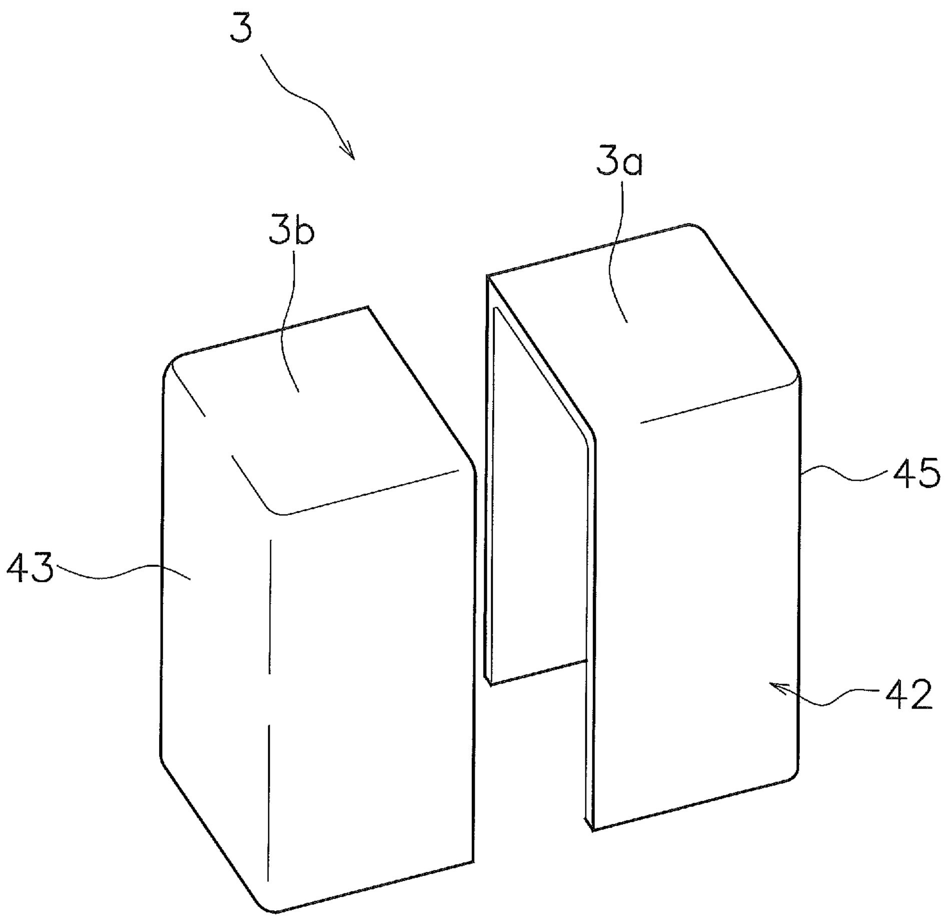
FIG. 14 is a perspective view of an outer case of an electronic component according to a sixth modification.

The outer case 3 may be composed of a plurality of parts. For example, as in the sixth modification illustrated in FIG. 14, the outer case 3 may include a first case part 3*a* and a second case part 3*b*.

REFERENCE SIGNS LIST

3 Outer case
5 Inner case
10 Opening
11, 12 Fixed contact
13 Movable contact
14 Drive device
28 Base
31 Inner top surface
42 Outer side surface
61-68 Rib
71-74 Locking portion
G1-G5 Gap

The invention claimed is:

1. An electronic component, comprising:
an internal component;
an inner case that houses the internal component, the inner case being hermetically sealed; and
an outer case arranged outside the inner case with an air-filled gap between walls of the inner case and walls of the outer case, the outer case including an opening that establishes fluid communication between the gap and an outside of the outer case, whereby air is able to pass from the air-filled gap to the outside of the outer case via the opening, wherein the electronic component is a relay.

2. The electronic component according to claim 1, wherein the outer case is fixed to the inner case.

3. The electronic component according to claim 1, further comprising:

a rib provided on an outer surface of the inner case or an inner surface of the outer case.

4. The electronic component according to claim 1, wherein the inner case includes a base that supports the internal component, and a cover attached to the base, the cover includes an inner side surface attached to the base, and an inner top surface that faces the base, the outer case includes an outer top surface arranged outside the inner top surface, and an outer side surface arranged outside the inner side surface, and the gap is provided between the inner top surface and the outer top surface.

5. The electronic component according to claim 4, further comprising:

a rib protruding from the inner top surface or the outer top surface.

6. The electronic component according to claim 1, wherein the inner case includes a base that supports the internal component, and a cover attached to the base, the cover includes an inner side surface attached to the base, and an inner top surface that faces the base, the outer case includes an outer top surface arranged outside the inner top surface, and an outer side surface arranged outside the inner side surface, and the gap is provided between the inner side surface and the outer side surface.

7. The electronic component according to claim 6, further comprising:

a rib protruding from the inner side surface or the outer side surface.

8. The electronic component according to claim 1, wherein the outer case is bonded to the inner case.

9. The electronic component according to claim 1, wherein one of the outer case and the inner case includes a locking portion that locks to another.

10. The electronic component according to claim 1, wherein the inner case has been arranged in the outer case through the opening, and the gap communicates with the outside of the outer case through a space between the periphery of the opening and the inner case.

11. The electronic component according to claim 10, wherein a size of the gap between the opening and the inner case is smaller than a thickness of the outer case.

12. The electronic component according to claim 1, wherein the opening is a through hole provided in the outer case.

13. The electronic component according to claim 1, wherein a thickness of the outer case is larger than a thickness of the inner case.

14. The electronic component according to claim 1, wherein the outer case is made of a material having higher heat resistance than the inner case.

* * * * *